United States Patent Office 3,235,542
Patented Feb. 15, 1966

---

3,235,542
DIFLUOROMETHYL CONTAINING COMPOUNDS AND PROCESS FOR PREPARING SAME
Lewis H. Sarett, Princeton, and Tsung-Ying Shen, Westfield, N.J., assignors to Merck & Co., Inc., Rahway, N.J., a corporation of New Jersey
No Drawing. Filed Nov. 1, 1961, Ser. No. 149,226
15 Claims. (Cl. 260—211.5)

This invention relates to halomethylation and more particularly, to a method of introducing halomethyl groups into carbonyl or thiocarbonyl organic compounds.

This application is a continuation-in-part of application Serial Number 77,008, filed December 20, 1960, and now abandoned by applicants.

It is generally recognized in the art that many organic compounds containing halogen are of wide technical importance because of their unusual chemical and physical properties, such as high thermal stability and marked resistance to oxidative decomposition. In the field of medicinal organic chemistry, for example, the presence of fluorine in the molecule is known to favorably affect activity. Accordingly, it is desirable to provide methods of introducing halogen containing groups into organic compounds.

What is described herein is a process of halomethylation by reaction of a halocarbene with an organic compound which contains an oxygen or sulfur atom doubly bonded to carbon, the remaining groups of said carbon being singly bonded thereto and including an enolizable hydrogen in a position vicinal to said carbon. Thus the organic compound reactant contains a carbonyl group, that is $>C=O$, or a thiocarbonyl group, that is, $>C=S$, in which groups the two remaining bonds of the carbon are satisfied by being singly bonded to two groups, one of which contains an enolizable hydrogen in a position vicinal to said carbon. In the process the enolizable hydrogen containing carbonyl or thiocarbonyl is converted to a halomethylated olefinic ether

or a halomethylated olefinic thiocarbonyl ether

In an illustrative form of the invention, difluorocarbene is reacted with an organic compound which contains a carbonyl group, the remaining atoms on the carbon of said carbonyl being singly bonded thereto and including an enolizable hydrogen in a position vicinal to said carbon. What is produced thereby is a difluoromethylvinyl ether

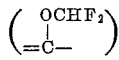

Typical classes of carbonyl and thiocarbonyl compounds servicable in the halomethylation reaction of the present invention are represented by the formulas:

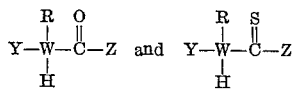

where H is an enolizable hydrogen, W is carbon or nitrogen, the Y and Z radicals are bonded to the carbon atom of the carbonyl or thiocarbonyl groups through said carbon or nitrogen, and R (necessary only when W is carbon) is an organic radical such as hydrogen, aliphatic, cycloaliphatic, aromatic and heterocyclic.

Preferably at least one of the Y and Z groups contains at least as a part thereof, an electron withdrawing group, such as an unsaturated bond. Typical electron withdrawing groups are olefinic, acetylenic, phenyl, aryl, substituted aryl, carbonyl, amide, carboxy, carboalkoxy, nitrile, sulfonyl and unsaturated heterocyclic. The nature of the remainder of Y and Z is not critical. These groups, if organic, can be hydrogen, aliphatic, cycloaliphatic, aromatic or heterocyclic in character. Y and Z also include groups which have terminal atoms in a cyclic ring system.

Accordingly illustrative organic reactants include β-ketoesters, β-diketones, β-ketoaldehydes, β-thioketones, cyclic β-ketoesters, α-β-unsaturated ketones, α-β-unsaturated amides, α-formyl esters, α-alkoxyoxalyl esters, arakyl aryl ketones, pyridones, quinolones, mercaptopurines and the like.

Preferred starting compounds are shown below:

α,β-Unsaturated ketone

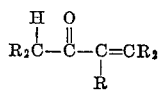

α,β-Unsaturated amide

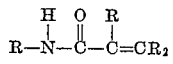

β-Thioketo ester

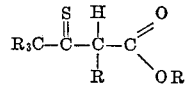

α-Formylester

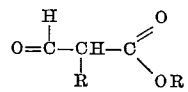

α-Alkoxy oxalyl ester

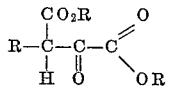

β-Keto ester

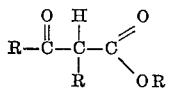

Aralkyl aryl ketone

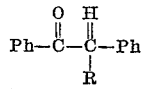

α-Trifluoro acetyl ester

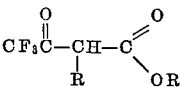

Cyclic β-keto ester

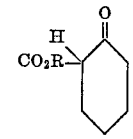

3,5-Pyrazolidenediones

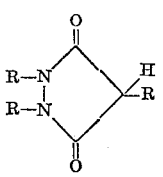

6-Mercapto purine

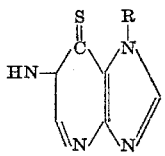

α-Pyridone

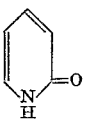

The R groups can be alike or different and can be hydrogen, aliphatic, cycloaliphatic, aromatic or heterocyclic in character. For reasons of availability compounds to which the R groups contain at most 18 carbon atoms are preferred.

Suitable halocarbenes utilized in the process of the present invention include difluorocarbene, $:CF_2$; dichlorocarbene, $:CCl_2$; fluorocarbene, $:CHF$; dibromocarbene, $:CBr_2$; and mixed halogen carbenes, such as chlorofluorocarbene, $:CClF$.

The halocarbene halomethylating agents used herein preferably are formed during the reaction by precursors which generate the halocarbene in situ. Suitable methods for generating the halocarbenes in situ are described in the literature. Specifically, the halocarbenes may be formed by reacting a halomethane substituted compound with a base (Hine and Tanabe, J. Am. Chem. Soc. 80, 3002 (1958)). Other methods for generating halocarbenes are described by Parham and Schweizer, J. Org. Chem. 24, 1933 (1959) and by Birehall, Cross and Hazeldine, Proc. Chem. Soc. 81, (1960).

The process may be summarized as follows:

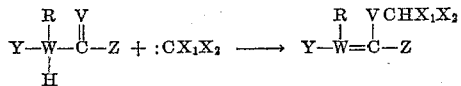

There is thus produced halomethylated vinyl ethers where V is either oxygen or sulfur, W, Y, Z and R are as previously defined, and $X_1$ is either hydrogen or halogen, and $X_2$ is halogen. C, W, Y and Z also may be part of a cyclic system.

In accordance with the preferred practice of the present invention, the reaction between the halocarbene and the enolizable carbonyl or thiocarbonyl compound preferably is carried out in situ in solution. Accordingly the compound to be haloalkylated is first dissolved in a solvent. Suitable solvents are ethers such as dimethoxyethane, tetrahydrofuran, diglyme and dioxane and also hydrolytic solvents, such as water and alcohol.

Then a suitable base is added to the solution. Preferably the base is present in the amount at least sufficient to form in situ both the enolate and the calocarbene, and preferably in a slight excess. Suitable bases are alkoxide, hydrides, organic metallics, such as butyl lithium, a Grignard reagent, amines such as tetraethylguanidine, amides, such as sodamide and diethylamide, and the like.

The product of the reaction between these two reactants then undergoes a protonation in situ to form the desired product. While the organic reactant itself may serve as a protonating source within the reaction medium, it is desirable that an additional protonation source be provided therein. A suitable one is t-butyl alcohol.

In a typical run, a halocarbene precursor, for example, fluorodichloromethane, is introduced into the basic carbonyl solution thereby effecting a reaction in situ. The reaction is suitably carried out at atmospheric pressure or in a bomb, particularly at a temperature of −25° C.–300° C. and preferably between 0° C.–25° C. The reaction time is usually between 5 minutes and 24 hours. Preferably during this period the contents of the reaction vessel are intimately mixed. The product is there upon isolated from the mixture by techniques well known in the art, such as solvent extraction and fractional distillation of liquid products, or by fractional crystallization or chromatography of solid products.

Examples 1 and 2 are illustrative of reactions effected upon an organic heterocyclic carbonyl compound in which W is nitrogen and Y and Z are linked together as part of a cyclic system.

EXAMPLE 1

Preparation of 2-difluoromethoxy-quinoline

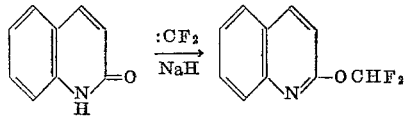

A mixture of 4.2 g. (0.03 mole) of a α-quinolone and 0.75 g. of sodium hydride in 60 ml. of dimethoxyethane is stirred in an ice-bath till a clear solution of the sodio derivative of the anion is obtained. A steady stream of chlorodifluoromethane is introduced into the reaction mixture and the resulting solution is allowed to stand at room temperature for 18 hours. The reaction mixture is partitioned between ether and 3% aqueous acetic acid. The ether layer is concentrated and subjected to chromatography on an alumina column and the fractions eluted by mixtures of ether and petroleum ether ranging from 5% to 100% ether. In the range 5–30% ether the desired compound, M.P. 34° is obtained:

Calcd. for $C_{10}H_7NOF_2$: C, 61.6; H, 3.59; F, 19.47; N, 7.18.

Found: C, 62.66; H, 3.77; F, 15.68; N, 5.10.

EXAMPLE 2

In a similar manner to Example 1 using an equivalent amount of chlorofluoromethane in place of chlorodifluoromethane, 2-fluoromethoxy-α-quinoline is obtained.

Examples 3 and 4 are illustrative of a reaction effected upon an organic compound in which W is carbon and in which both Y and Z are electron withdrawing groups including one aromatic and one carboalkoxy group.

EXAMPLE 3

Preparation of methyl α-difluoromethoxy-β-methoxy-carbonyl-β-(1-naphthyl) acrylate

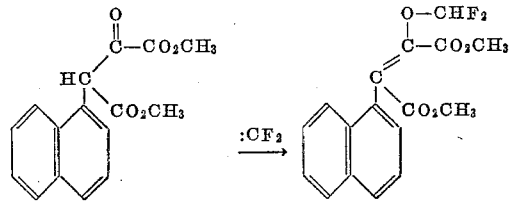

A mixture of 40 g. of ethyl naphthalene-1-acetate, 40 g. of dimethoxalate and 20 g. of sodium methoxide in 600 ml. ether is heated under refluxe for 4 hours. The yellow enolate formed is filtered, washed with ether, and stirred with a mixture of benzene, acetic acid and water. The benzene layer is washed, dried, evaporated, redissolved in ether-benzene, and treated with 1 mole of sodium hydride for four hours. The mixture is diluted with ether and the yellow enolate is collected on a filter, washed with ether and dried in vacuo.

To a solution of 53.8 g. of the enolate and freshly prepared sodium t-butoxide (from 13.8 g. of sodium) in 400 ml. dimethoxyethane is added an excess of chlorodifluoromethane at 5–10°, and the reaction mixture is allowed to stand overnight at room temperature. The mixture is then poured into iced-water containing a small amount of acetic acid and the crude product is extracted into ether. The ether solution is washed with 4 x 500 ml. of 0.2 N sodium hydroxide, 2 x 200 ml. water and then dried over sodium sulfate. After filtration and evaporation the syrupy product is chromatographed on 1 lb. of acid-washed alumina using 30% ether in petroleum ether as the element to give the desired product.

EXAMPLE 4

Using an equivalent amount of chlorodibromomethane in place of chlorodifluoromethane in the above example, the corresponding dibromoethyl derivative is obtained.

Examples 5 and 6 are illustrative of reaction effected upon a thiocarbonyl compound in which W, Y and Z are all part of a cyclic system.

EXAMPLE 5

*Preparation of 6-difluoromethylthiopurine*

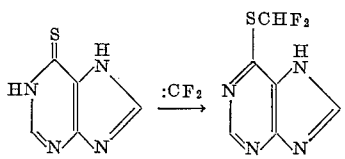

To a solution of 3.04 g. (0.02 mole) of 6-mercaptopurine in 100 ml. dimethoxyethane at −10° is added 2.25 g. (0.02 mole) of potassium t-butoxide portionwise with stirring under an atmosphere of nitrogen. After 10 min. a stream of chlorodifluoromethane is introduced into the reaction vessel for ca. 10 minutes and the mixture is allowed to stir at −10°–0° for ½ hour, and then at room temperature for 2 hours. The solution is poured into 500 ml. iced water and extracted three times with methylene dichloride. After evaporation the syrupy residue is chromatographed on a column of silica gel, using mixtures of benzene and petroleum ether as the elutant, to give 6-difluoromethylthiopurine.

EXAMPLE 6

Using an equivalent amount of chloroform in place of chlorodifluoromethane in the above examples, 6-dichloromethylthiopurine is obtained.

Examples 7 and 8 are illustrative of reaction effected upon a carbonyl in which one of Y and Z is an electron withdrawn group.

EXAMPLE 7

*Preparation of ethyl 2-ethyl-3-difluoromethoxy crotonate*

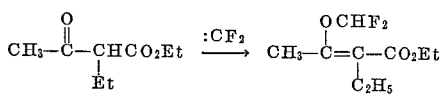

In a 500 ml. 3-necked flask is placed 250 ml. of dimethoxyethane, 23.7 g. (0.15 mole) of ethyl 2-ethylacetoacetate, 33.66 g. (0.30 mole) of potassium t-butoxide and 26 g. of chlorodifluoromethane in dimethoxyethane. The mixture is stirred in an ice-bath for ca. 1 hour and then at room temperature overnight. The solution is poured into 500 ml. water containing 10 ml. of acetic acid and is then extracted with ether. The ether solution is washed with water, dried over sodium sulfate, filtered and evaporated. Fractionation of the residual oil gives a mixture of ethyl 2-difluoromethyl-2-ethylacetoacetate and the desired ethyl 2-ethyl-3-difluoromethoxy crotonate, B.P. 104°–116° (15 min.) $n_D^{21}$ 1.4135–1.4190.

EXAMPLE 8

Using an equivalent amount of chlorodibromomethane in place of chlorodifluoromethane in the above example, the corresponding dibromomethyl derivative is obtained.

Examples 9 and 10 further illustrate compounds used as organic reactants in the process of the present invention.

EXAMPLE 9

*Preparation of methyl α-(1-benzyl-2-methyl-5-chloro-3-indolyl)-β-difluoromethoxy acrylate*

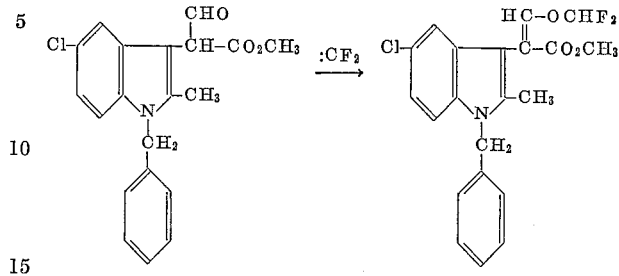

Treatment of a solution of methyl 1-benzyl-2-methyl-5-chloro-3-indolyl-α-formylacetate (0.02 mole) potassium t-butoxide (0.04 mole) in 200 ml. dimethoxyethane at 0°–5° with excess chlorodifluoromethane for 2 hours and working up in the manner described in Example 2 gives a crude mixture containing methyl α-(1-benzyl-2-methyl-5-chloro-3-indolyl)-β-difluoromethoxy acrylate which is purified by chromatography on 200 g. of acid-washed alumina using a mixture of 50–100% (v./v.) ether-petroleum ether as the elutant.

EXAMPLE 10

*Preparation of 1,2-diphenyl-3-difluoromethoxy-4-butyl-5-pyrazolone*

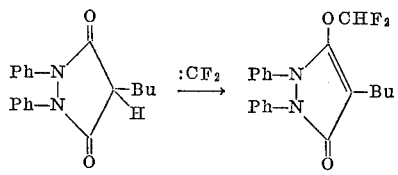

To a solution of phenylbutazone (0.01 mole) and potassium t-butoxide (0.02 mole) in 150 ml. dimethoxyethane at 5° is added an excess of chlorodifluoromethane with stirring and ice-cooling. After 3 hours the solution is poured into 500 ml. ice-water and extracted with ether. The ether solution is washed once with sodium carbonate, once with water dried over sodium sulfate and evaporated. The crude product is chromatographed on 200 g. benzene and petroleum ether as the element to give 1,2-diphenyl-3-difluoromethoxy-4-butyl-5-pyrazolone.

EXAMPLE 11

*Preparation of 6-difluoromethylthio-9-β-ribofuranosyl purine*

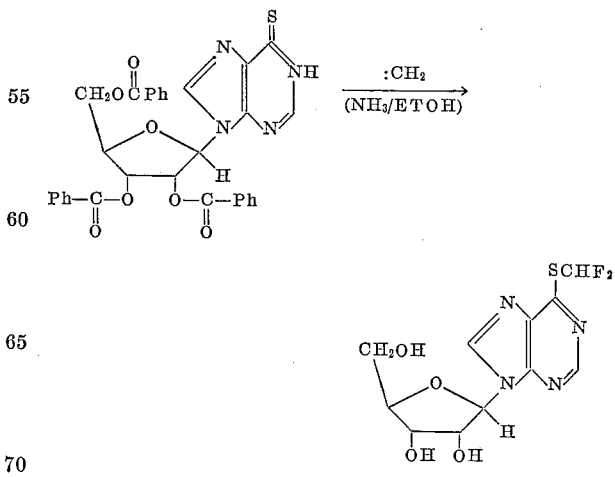

The starting material is produced in the following manner: 6-chloro-9-β-ribofuranosylpurine is treated with 3 moles of benzoyl chloride in pyridine to give 6-chloro-9-β-D(2,3,5-tri-O-benzoyl)ribofuranosylpurine.

The above 6-chloropurine nucleoside is converted to

6 - mercapto - 9-β-D-(2,3,5-tri-O-benzoyl)ribofuranosylpurine with sodium hydrogen sulfide following the method of J. A. Johnson, Jr., and H. J. Thomas, as described in J. Am. Chem. Soc., 78, 3863 (1956).

To a solution of 0.01 mole of 6-mercapto-9-β-D(2,3,5-tri-O-benzoyl)ribofuranosylpurine in 200 ml. dimethoxyethane at −10° is added portionwise 0.02 mole of potassium t-butoxide with stirring. A steady stream of chlorodifluoromethane is introduced into the reaction mixture for a period of ½ hr., and the mixture is then stirred at 0° for 2 hrs. and at room temperature for 4 hrs. The solution is poured into 1 l. iced-water containing 0.02 mole of acetic acid, and the product is extracted with 3 x 500 ml. chloroform. The chloroform solution is washed with water, dried over sodium sulfate and concentrated in vacuo syrup. The crude product is chromatographed on 2 lb. of silica gel to give 6-difluoromethylthio - 9 - β-D-(2,3,5-tri-O-benzoyl)ribofuranosylpurine. The above tribenzoate (1.0 g.) is heated in 100 ml. of ethanolic ammonia (saturated at 0°) in a sealed tube at 100° for 12 hrs. The tube is cooled, opened and the content is concentrated to a syrup. Chromatography on a silica gel column gives 6-difluoromethylthio-9-β-D-ribofuranosylpurine.

EXAMPLE 12

*Preparation of 6-difluoromethylthio-9-ethyl-purine*

Treatment of 9-ethyl-6-mercaptopurine with potassium t-butoxide and chlorodifluoromethane in the above manner starting at paragraph three of the above example gives 6-difluoromethylthio-9-ethylpurine.

From the foregoing discussion it will be clear that the invention is generic to the formation of olefinic ethers and olefinic thioethers by the halomethylation of a halocarbene with organic compounds which contain a carbonyl or thiocarbonyl group having an enolizable hydrogen atom vicinal to the carbon atom of said group under reaction conditions which generate the enol in situ. While a one-step process is preferred, it will be understood that one also may first isolate an enolate reactant from the carbonyl precursor, and then react it with the halocarbene to form the desired product. Such a two-step process is illustrated by Example 3.

The halomethylated compounds produced by the process of the present invention are novel compounds. Formation of these compounds may be used as a means of protecting a carbonyl or a thiocarbonyl group under reaction conditions which otherwise would attack such groups. The original starting carbonyl or thiocarbonyl compound then may be generated by hydrolysis of the vinyl ether. They can serve unusually well as intermediates in the preparation of other halogen-containing compounds which are difficult to obtain in any other manner. As an illustration thereof, they may undergo reactions characteristic of vinyl ethers. They also may undergo cyclization reactions to provide ring systems. Physically, they may be gasses, liquids or solids. They can be used in the form of gasses or liquids carried in aerosol sprays used in the field of insecticides. When they are derivatives of known medicinally active compounds, they also can be used for medicinal purposes.

The foregoing detailed descriptions and examples have been given mainly to impart clearness and understanding and not as a limitation of the present invention whose generic features will be readily apparent to those skilled in the art. Accordingly, the invention is not limited to the exact details shown and described but, rather, is bound solely by the claims.

What is claimed is:
1. Compounds of the formula

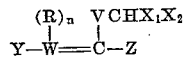

wherein $X_1$ is selected from the group consisting of hydrogen and halogen, $X_2$ is halogen, V is selected from the group consisting of oxygen and sulfur, W is selected from the group consisting of carbon and nitrogen, $n$ is selected from the group consisting of 0 and 1 and is 0 when W is nitrogen, and R, Z, and Y are selected from the group consisting of hydrogen, alkly, carboalkoxy, aryl having up to 12 carbon atoms, and radicals in which Z, R, and Y are part of a heterocyclic system containing from 1–3 nitrogen atoms as hetero atoms and from 1–3 heterocyclic rings selected from the group consisting of 5- and 6-membered heterocyclic rings, at least one of R, Y, and Z including as part thereof an electron withdrawing group.

2. The compounds of claim 1 wherein V is sulfur.
3. The compounds of claim 1 wherein W is nitrogen.
4. The compounds of claim 1 wherein the electron withdrawing group is selected from the group consisting of olefinic, acetylenic, phenyl, carbonyl, amide, carboxy, carboalkoxy, nitrile, and sulfonyl.
5. 2-difluoromethoxy-quinoline.
6. Ethyl 2-ethyl-3-difluoromethoxy crotonate.
7. 6-difluoromethylthiopurine.
8. 6-difluoromethylthio-9-glycosylpurine.
9. 6-difluoromethylthio-9-β-ribofuranosylpurine.
10. The process for halomethylating organic compounds which comprises reacting a halocarbene wherein the halo substituent is selected from the group consisting of fluoro, chloro, and bromo, with a compound containing a grouping selected from the group consisting of

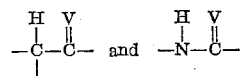

wherein V is selected from the group consisting of oxygen and sulfur and the hydrogen attached to the carbon and nitrogen atoms is an enolizable hydrogen, the remaining groups of said compound being singly bonded to said grouping.

11. The process according to claim 10 wherein the halocarbene is selected from the group consisting of difluorocarbene, dichlorocarbene, fluorocarbene, and dibromocarbene.
12. The process according to claim 10 wherein at least one of said remaining groups includes an electron withdrawing group.
13. The process according to claim 12 wherein the electron withdrawing group is selected from the group consisting of olefinic, acetylenic, aryl, amide, carboxy, carboalkoxy, nitrile, sulfonyl, and unsaturated groups.
14. The process according to claim 10 wherein the halocarbene is formed in situ in basic solution and the reaction is carried out at a temperature of between −25° C. and 300° C.
15. The process according to claim 14 wherein the halocarbene is derived from chlorodifluoromethane.

References Cited by the Examiner

UNITED STATES PATENTS 2,411,158  11/1946  Hanford _____ 260—485

OTHER REFERENCES

Doering et al., J.A.C.S., Vol 76, pages 6162–6165 (1954).
Ledwith et al., Chemistry and Industry (London), 1959, pages 459–460.
Skell et al., J.A.C.S., Vol. 78, pages 4496–4497 (1956).
Williams, Dissertation Abstracts, Vol. 19, pages 1924–1925 (1959).

LEWIS GOTTS, *Primary Examiner.*

V. E. LEVOW, *Examiner.*